United States Patent [19]
Sakaguchi et al.

[11] Patent Number: 5,939,040
[45] Date of Patent: Aug. 17, 1999

[54] METHOD FOR PRODUCING CRYSTALLINE, INORGANIC ION EXCHANGE MATERIAL

[75] Inventors: Mikio Sakaguchi; Kazuhiro Otsuka; Taisuke Aosaki, all of Wakayama, Japan

[73] Assignee: KAO Corporation, Tokyo, Japan

[21] Appl. No.: 08/894,689

[22] PCT Filed: Mar. 4, 1996

[86] PCT No.: PCT/JP96/00516

§ 371 Date: Aug. 26, 1997

§ 102(e) Date: Aug. 26, 1997

[87] PCT Pub. No.: WO96/27555

PCT Pub. Date: Sep. 12, 1996

[30] Foreign Application Priority Data

Mar. 6, 1995 [JP] Japan ................................. 7-074526

[51] Int. Cl.$^6$ .................................................. C01B 33/36
[52] U.S. Cl. ........................................ 423/331; 423/332
[58] Field of Search ..................................... 423/331, 332

[56] References Cited

U.S. PATENT DOCUMENTS

| | | | |
|---|---|---|---|
| 5,427,711 | 6/1995 | Sakaguchi et al. ...................... | 423/331 |
| 5,567,404 | 10/1996 | Lee et al. ................................. | 423/332 |
| 5,614,160 | 3/1997 | Gill et al. ................................. | 423/332 |
| 5,618,783 | 4/1997 | Sakaguchi et al. ...................... | 423/332 |
| 5,643,358 | 7/1997 | Borgstedt et al. ....................... | 423/332 |
| 5,739,098 | 4/1998 | Denkewicz et al. ..................... | 423/332 |

FOREIGN PATENT DOCUMENTS

| | | |
|---|---|---|
| 550 048 | 7/1993 | European Pat. Off. . |
| 630 855 | 12/1994 | European Pat. Off. . |
| 95/34506 | 12/1995 | WIPO . |
| 96/01307 | 1/1996 | WIPO . |

*Primary Examiner*—Mark L. Bell
*Assistant Examiner*—David Sample
*Attorney, Agent, or Firm*—Birch, Stewart, Kolasch & Birch

[57] ABSTRACT

A method for producing a crystalline, inorganic ion exchange material having the following composition: $x_1K_2O \cdot x_2Na_2O \cdot ySiO_2 \cdot zMeO$, wherein $x_1$, $x_2$, $y$ and $z$ are numerical values satisfying the following relationships: $y/(x_1+x_2)=1.0$ to $2.1$, $z/y=0$ to $1.0$, $x_1/x_2=0.01$ to $2.0$, and Me stands for Ca and/or Mg, the method including the steps of adding and blending one or more alkali metal compounds, or one or more alkali metal compounds and one or more alkaline earth metal compounds in cullets having a composition of $SiO_2/Na_2O=1.5$ to $4.2$, and baking the resulting mixture.

10 Claims, 1 Drawing Sheet

METHOD FOR PRODUCING CRYSTALLINE, INORGANIC ION EXCHANGE MATERIAL

TECHNICAL FIELD

The present invention relates to a method for producing crystalline, inorganic ion exchange material, specifically silicate builders, useful for ion exchangers and alkalizers.

BACKGROUND ART

Since silicate ion exchange materials have alkaline buffering properties, they are highly useful for detergent builders. Particularly, since the silicate ion exchange materials in crystalline forms have excellent cationic exchange capacities, they are greatly useful for detergent builders.

Among the methods for producing silicate builders, Japanese Patent Laid-Open No. 5-66888 discloses a method using water glass as a starting material. In this method, the method for producing crystalline sodium silicate having a layered structure is produced by a method comprising the steps of spray-drying a water glass solution to form amorphous sodium silicate, and heating the resulting sodium silicate in a firing zone while recirculating a portion of the product. However, this method requires drying off large amounts of the water content from the water glass, which makes it disadvantageous from an energy-saving viewpoint.

Japanese Patent Laid-Open No. 6-72008 discloses a method for directly baking the glassy product to solve the above problems. In this method, crystalline sodium silicate is produced by the steps of pulverizing a water glass product obtainable by cooling a fused mixture of sand and soda, and then heating the pulverized product. However, in this method, since the resulting product comprises a two-component system of $Na_2O$—$SiO_2$, the control of the crystalline system becomes difficult, rendering the method unsatisfactory for ion exchange materials for detergents.

DISCLOSURE OF THE INVENTION

In view of the above problems, an object of the present invention is to provide a method for easily producing high-performance silicate ion exchange material using inexpensive cullets.

This object is achieved by a specific method for producing an ion exchange material of the present invention.

Specifically, the gist of the present invention is as follows:
(1) A method for producing a crystalline, inorganic ion exchange material having the following composition:

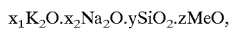

wherein $x_1$, $x_2$, $y$ and $z$ are numerical values satisfying the following relationships: $y/(x_1+x_2)=1.0$ to $2.1$, $z/y=0$ to $1.0$, $x_1/x_2=0.01$ to $2.0$, and Me stands for Ca and/or Mg, the method comprising the steps of adding and blending one or more alkali metal compounds, or one or more alkali metal compounds and one or more alkaline earth metal compounds in cullets having a composition of $SiO_2/Na_2O=1.5$ to $4.2$, and baking the resulting mixture;
(2) The method described in item (1) above, wherein $z/y$ and $Mg/Ca$ satisfy the following relationship: $z/y=0.002$ to $0.32$, and $Mg/Ca=0.01$ to $100$;
(3) The method described in item (1) or item (2) above, wherein the cullets are obtainable by the steps of fusing a mixture of silica sand and sodium carbonate at a temperature of from 1000 to 1400° C., and cooling the resulting mixture;
(4) The method described in any one of items (1) to (3) above, wherein cullets are sodium silicate cullets ($SiO_2/Na_2O$ ratio of from 2.5 to 3.5);
(5) The method described in any one of items (1) to (3) above, wherein the cullets have a composition of $SiO_2/(Na,K)_2O=2.1$ to $4.2$, $K/Na=0$ to $2.0$, and $Ca/Si=0$ to $0.32$;
(6) The method described in item (5) above, wherein the K/Na value of the cullets is from 0.01 to 2.0;
(7) The method described in any one of items (1) to (6) above, wherein the alkali metal compound is selected from the group consisting of potassium hydroxide, sodium hydroxide, potassium carbonate, sodium carbonate, potassium sulfate, and sodium sulfate, and wherein the alkaline earth metal compound is selected from the group consisting of calcium oxide, magnesium oxide, calcium hydroxide, magnesium hydroxide, calcium carbonate, magnesium carbonate, calcium nitrate, magnesium nitrate, calcium chloride, magnesium chloride, calcium sulfate, and magnesium sulfate; and
(8) The method described in item (1) above, wherein the cullets have an average particle size of from 2 to 9000 μm, and wherein a 12–60% by weight KOH aqueous solution and a 12–60% by weight NaOH aqueous solution are added as alkali metal compounds, thereby giving a water content of from 1 to 45% by weight after addition.

BEST MODE FOR CARRYING OUT THE INVENTION

Figure 1:
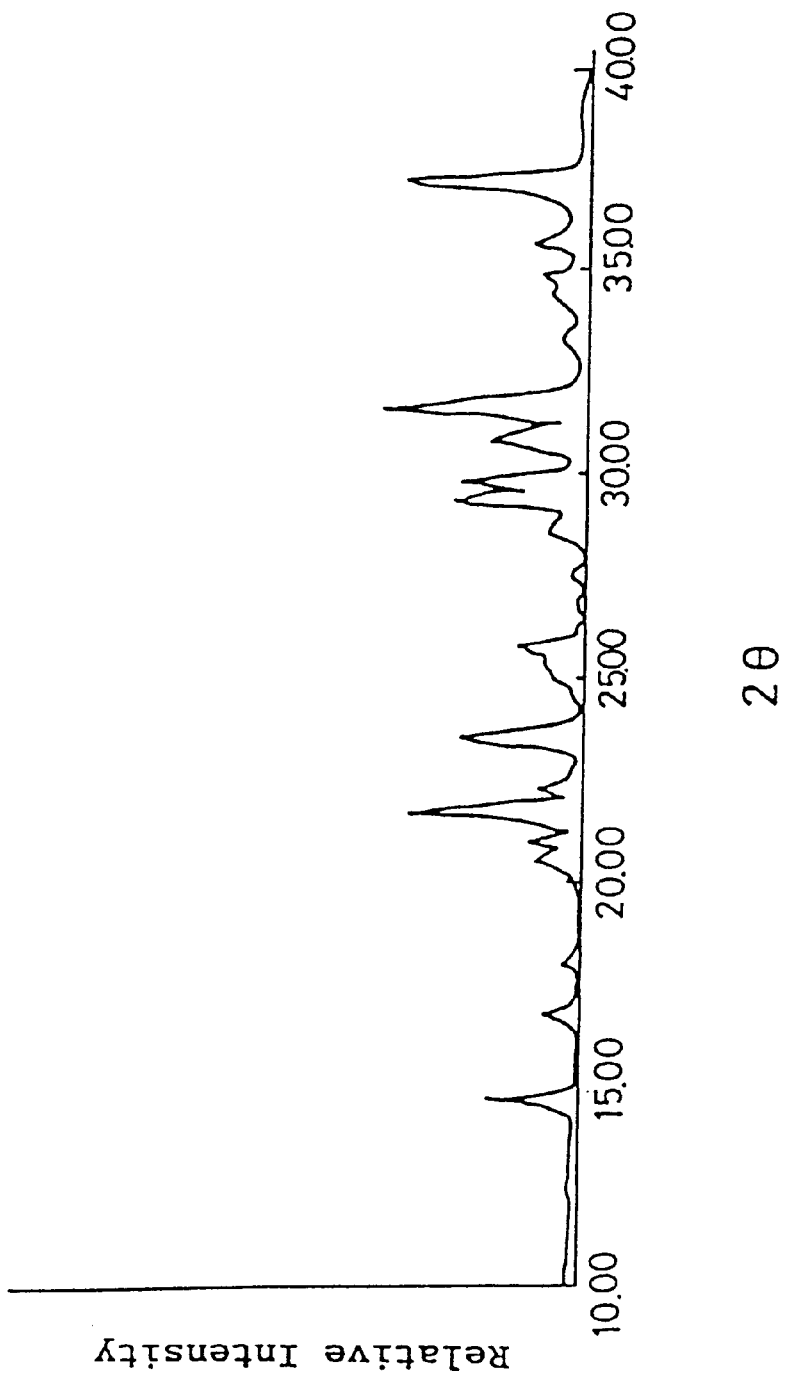
FIG. 1 is a graph showing an X-ray diffraction pattern of an inorganic ion exchange material powder obtained in Example 1.

The method for producing a crystalline, inorganic ion exchange material having the following composition:

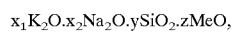

wherein $x_1$, $x_2$, $y$ and $z$ are numerical values satisfying the following relationships: $y/(x_1+x_2)=1.0$ to $2.1$, $z/y=0$ to $1.0$, $x_1/x_2=0.01$ to $2.0$, and Me stands for Ca and/or Mg, the method being characterized by adding and blending one or more alkali metal compounds, or one or more alkali metal compounds and one or more alkaline metal compounds in the form of cullets having a composition of $SiO_2/Na_2O=1.5$ to $4.2$, and then baking the resulting mixture.

In other words, the method is characterized by the incorporation of alkali metals and alkaline earth metals into the above ion exchange material compositions and by specific preparation conditions of the materials for baking. The method of the present invention will be explained in detail below.

The cullets in the present invention refer to granulated products of alkali silicate glass obtainable by fusing methods. The usable cullets are not particularly limited, as long as their $SiO_2/Na_2O$ ratios are in the range of from 1.5 to 4.2, preferably from 1.7 to 3.7. For example, any kind of anhydrous, $Na_2O$—$SiO_2$ cullets for preparing sodium silicates can be used. Among them, from the viewpoint of providing an inexpensive composition, sodium silicate cullets ($SiO_2/Na_2O$ ratio of from 2.5 to 3.5) can be used. The anhydrous, $Na_2O$—$SiO_2$-type cullets are generally produced by fusing a mixture of silica sand and sodium carbonate at a temperature of from 1000 to 1400° C. for 1 to 24 hours, and cooling the resulting mixture.

Alternatively, because of their excellent ion exchange properties, cullets having the following composition are also usable:

$SiO_2/(Na,K)_2O=2.1$ to 4.2, $K/Na=0$ to 2.0, and $Ca/Si=0$ to 0.32.

Among the cullets having the above composition, a preference is given to those satisfying $K/Na=0.01$ to 2.0.

Although the shapes and sizes of the cullets are not particularly limited, from the viewpoint of reactivity, the cullets preferably have an average particle size of from 2 to 9000 $\mu$m, more preferably from 10 to 1000 $\mu$m.

The usable alkali metal compounds include hydroxides, carbonates, sulfates, etc. of potassium or sodium. Examples include KOH, NaOH, $Na_2CO_3$, $K_2CO_3$, and $Na_2SO_4$.

The amount of the alkali metal compounds added is determined by the kinds and amounts of the cullets used and the composition of the desired final product. Also, the alkali metal compounds may be present in the form of solutions, powders, and granules, with a preference being given to solutions from the viewpoint of reactivity.

Therefore, among the above alkali metal compounds, a preference is given to the compounds which easily dissolve in water, with a particular preference being given to hydroxides, such as KOH and NaOH, which are provided in the form of aqueous solutions.

In the case where the above aqueous solution is used, it is preferable to use the KOH aqueous solutions in concentrations of 12 to 60% by weight and the NaOH aqueous solutions in concentrations of 12 to 60% by weight. More preferably, the KOH aqueous solutions are used in concentrations of 36 to 60% by weight and the NaOH aqueous solutions are used in concentrations of 36 to 60% by weight. When the concentrations of the NaOH aqueous solutions and the KOH aqueous solutions exceed 60% by weight, blending under ambient temperature may be difficult, and when the concentrations are lower than 12% by weight, the amount of water content may become undesirably large, so that more energy is required upon baking, precluding the industrial use of the method.

In the case where the alkaline earth metal compounds are used, the alkaline earth metal compounds include oxides, hydroxides, carbonates, nitrates, chlorides, sulfates, etc. of calcium or magnesium. Examples thereof include $CaCO_3$, $MgCO_3$, $Ca(OH)_2$, $Mg(OH)_2$, MgO, $Ca(NO_3)_2 \cdot nH_2O$, $Mg(NO_3)_2 \cdot nH_2O$, $CaCl_2 \cdot nH_2O$, $MgCl_2 \cdot nH_2O$, $CaSO_4 \cdot nH_2O$, and $MgSO_4 \cdot nH_2O$ (In each hydrate, n is usually a number of from 0 to 20.). Just as in the case of the alkali metal compounds, the amount of the alkaline earth metal compounds added is determined by the kinds and amounts of the cullets and the composition of the desired final product. Also, the alkaline earth metal compounds may be present in the form of solutions, powders, and granules.

In the production method of the present invention, the materials used for baking can be prepared using the above starting materials and adding and blending an alkali metal compound or an alkali metal compound and an alkaline earth metal compound in an aqueous solution or in the form of a solid to thereby form a uniform mixture.

In the above method, a method for adding and blending may include the step of adding these starting materials simultaneously and blending them by a suitable method. In an alternative method, each of these starting materials may be added sequentially.

The water content after the adding and blending step in the present invention is preferably 1 to 45% by weight, more preferably 5 to 36% by weight. When the water content is less than 1% by weight, the crystallization is less likely to progress during baking. On the other hand, when the water content exceeds 45% by weight, a large amount of energy is required during baking.

The baking may be carried out in the present invention by any of the generally known methods, including a process comprising the steps of baking the starting materials at a temperature normally ranging from 300 to 1500° C., preferably from 400 to 1000° C., more preferably from 500 to 900° C., to crystallize the resulting product. When the heating temperature is less than 300° C., crystallization may be insufficient, with the result that the anti-solubility in water of the resulting inorganic ion exchange material is poor, and when it exceeds 1500° C., coarse grains are likely to form, thereby decreasing the ion exchange capacity of the resulting inorganic ion exchange material. The heating time is normally 0.1 to 24 hours. Such baking can normally be carried out in a heating furnace, such as an electric furnace or a gas furnace. In certain cases, the baked product may be further subjected to a hydrothermal treatment.

The baked product may be pulverized, where necessary, to a given granularity. The pulverization is achieved using a ball mill, a roller mill or any other mechanical mills.

The inorganic ion exchange material of the present invention may be easily formed into a hydrate by any known method without limitation. For example, a hydrate of an inorganic ion exchange material can be obtained by suspending the anhydride of the above inorganic ion exchange material in ion-exchanged water to form a hydrate, which is then dried to yield a powder.

The crystalline, inorganic ion exchange material obtainable by the method of the present invention mentioned above has the composition of $x_1K_2O \cdot x_2Na_2O \cdot ySiO_2 \cdot zMeO$, wherein $x_1$, $x_2$, y and z are numerical values satisfying the following relationships: $y/(x_1+x_2)=1.0$ to 2.1, $z/y=0$ to 1.0, $x_1/x_2=0.01$ to 2.0, and Me stands for Ca and/or Mg. In the present invention, a preference is given to those having the above formula wherein $z/y=0.002$ to 0.32, $x_1/x_2=0.03$ to 1.0, and $Mg/Ca=0.01$ to 100, from the viewpoint of structural stability in water.

Since the crystalline, inorganic ion exchange materials mentioned above have excellent ion exchange capacity, ion exchange speed, alkaline capacity, and anti-solubility in water, they are highly useful as ion exchangers and alkalizers.

The present invention will be explained in detail below by the following Examples and Comparative Examples, without intending to limit the scope of the present invention thereto.

In the following Examples and Comparative Examples, the ion exchange property was evaluated by the following method. Specifically, a 0.04 g sample pulverized to a size of 325 mesh-pass (average particle size: $10\pm2$ $\mu$m; measured by a laser diffraction particle size analyzer, "LA-500," manufactured by Horiba, LTD.) was accurately weighed and added to 100 ml of a calcium chloride aqueous solution (100 ppm concentration, when calculated as $CaCO_3$), followed by stirring at 10° C. for 1 minute. Thereafter, the mixture was filtered using a membrane filter of 0.2 $\mu$m pore size. 10 ml of the filtrate was assayed for Ca content by an EDTA titration. In the evaluation for the ion exchange property, the values found were expressed in $CaCO_3$ mg/g.min in the following Examples and Comparative Examples.

EXAMPLE 1

134.9 g of anhydrous sodium silicate cullets ($SiO_2/Na_2O=3.20$) grounded to a size of 150 mesh-pass, 36.50 g of a 48% by weight NaOH aqueous solution, and 58.44 g of a 48% by weight KOH aqueous solution were blended, the water content being 21% by weight. The composition of the starting materials is shown in Table 1 together with those of other Examples and Comparative Example 1. The resulting mixture was baked in a nickel crucible at 600° C. for 2 hours. After baking, the baked product was pulverized to a size of 325 mesh-pass, to give a powdered inorganic ion exchange material.

The composition and the ion exchange property of the resulting ion exchange material are shown in Table 2. Also, the obtained powdered inorganic ion exchange material gave excellent crystallinity as shown in an X-ray diffraction pattern illustrated in FIG. 1. In addition, it had excellent ion exchange property.

EXAMPLES 2 TO 10

The same procedures as in Example 1 were carried out except for preparing the starting materials for baking so as to have the composition and the added water content as given in Table 1, and for changing the baking temperature as given in Table 2, to give each of the inorganic ion exchange materials. Here, in Examples 5, 7, 8 and 9, $Ca(OH)_2$ and, in some cases, also $Mg(OH)_2$ were added as starting materials. The composition and the ion exchange property of each of the resulting ion exchange materials are shown in Table 2. All of the resulting ion exchange materials gave excellent crystallinity and had excellent ion exchange properties.

EXAMPLE 11

The same procedures as in Example 1 were carried out except for using anhydrous NaOH and anhydrous KOH so as to give a water content of 0% by weight, to yield an inorganic ion exchange material. The composition and the ion exchange property of the resulting ion exchange material are shown in Table 2.

In the case where an aqueous solution was not employed as in this Example, the resulting ion exchange material had slightly poorer ion exchange property when compared to that of Example 1, though its composition was identical to that of Example 1.

EXAMPLES 12

134.9 g of anhydrous silicate cullets ($SiO_2/(Na,K)_2O$= 3.20; $K_2O/Na_2O$=0.1; $CaO/SiO_2$=0.03; $MgO/CaO$=0.1) having an average particle size of 85 μm, 35.30 g of a 48% by weight NaOH aqueous solution, and 42.99 g of a 48% by weight KOH aqueous solution were blended, the water content being 18% by weight. The resulting mixture was baked in a nickel crucible at 600° C. for 5 hours. After baking, the baked product was pulverized to a size of 325 mesh-pass, to give a powdered inorganic ion exchange material.

The composition and the ion exchange property of the resulting ion exchange material are shown in Table 4. The obtained powdered inorganic ion exchange material gave excellent crystallinity and had excellent ion exchange property.

EXAMPLES 13 TO 20

The baking starting materials having the compositions and the water contents as shown in Table 3 were used, and the same procedures as in Example 12 were carried out except for changing the baking temperatures as shown in Table 4 to give inorganic ion exchange materials of the present invention. Here, in Examples 13, 14, and 15, the components required for inorganic ion exchange materials, such as $Na_2O$, $K_2O$, CaO, and MgO, were contained partially or entirely in the cullet compositions. In Examples 16, 17, and 18, $Na_2O$ and CaO were contained partially or entirely in the cullet compositions. In Examples 19 and 20, $Na_2O$ and $K_2O$ were contained partially or entirely in the cullet compositions. In addition, in Example 16, a 60% by weight NaOH aqueous solution and a 60% by weight NaOH aqueous solution were employed; in Example 17, anhydrous NaOH and anhydrous KOH were employed; and in Example 20, $Ca(OH)_2$ and $Mg(OH)_2$ were employed.

The composition and the ion exchange property of each of the resulting ion exchange material are shown in Table 4. All of the obtained powdered inorganic ion exchange materials gave excellent crystallinity and had excellent ion exchange property.

EXAMPLE 21

The same procedures as in Example 2 were carried out except for changing the baking temperature to 600° C., to yield an inorganic ion exchange material. The composition and the ion exchange property of the resulting ion exchange material are shown in Table 4.

The obtained powdered inorganic ion exchange material gave excellent crystallinity and had excellent ion exchange property.

COMPARATIVE EXAMPLE 1

The same procedures as in Example 1 were carried out except for preparing starting materials for baking comprising 158.7 g of anhydrous cullets of sodium silicate ($SiO_2/Na_2O$=3.20) and 62.56 g of a 48% by weight NaOH aqueous solution alone, the water content being 15% by weight, to give a comparative ion exchange material. The composition and the ion exchange properties of the resulting ion exchange material are shown in Table 2.

The resulting ion exchange material had notably poorer performance in ion exchange properties when compared to those of the ion exchange materials obtained in Example 1 to 11.

COMPARATIVE EXAMPLES 2 TO 4

The baking starting materials having the compositions and the water contents as shown in Table 3 were used, and the same procedures as in Example 1 were carried out except for changing the baking temperatures as shown in Table 4 to give comparative inorganic ion exchange materials. In these comparative examples, anhydrous cullets ($SiO_2/(Na,K)_2O$= 3.20) were used as starting materials, and a 48% by weight NaOH aqueous solution and a 48% by weight NaOH aqueous solution were employed.

The compositions and the ion exchange property of each of the resulting ion exchange material are shown in Table 4. All of the obtained powdered inorganic ion exchange material had notably poorer ion exchange property when compared with those of Examples of the present invention.

COMPARATIVE EXAMPLE 5

The baking starting materials having the compositions and the water contents as shown in Table 3 were used, and the same procedures as in Example 1 were carried out to give comparative inorganic ion exchange materials. In this comparative example, anhydrous cullets ($SiO_2/(Na,K)_2O$= 12.00; $K_2O/Na_2O$=0.05) were used as starting materials, and a 48% by weight NaOH aqueous solution and a 48% by weight NaOH aqueous solution were employed.

The composition and the ion exchange property of the resulting ion exchange material are shown in Table 4. The obtained powdered inorganic ion exchange material had notably poorer ion exchange property when compared with those of Examples of the present invention.

TABLE 1

| | | Cullet | | Weight (g) of NaOH | | | Weight (g) of KOH | | | Water |
| | Weight (g) | $SiO_2/Na_2O$ | Average Particle Size (μm) | Solid Content | Aqueous Soln. | Conc. (% by weight) | Solid Content | Aqueous Soln. | Conc. (% by weight) | Content (% by weight) |
|---|---|---|---|---|---|---|---|---|---|---|
| Example Nos. | | | | | | | | | | |
| 1 | 134.9 | 3.20 | 21 | 17.52 | 36.50 | 48 | 28.05 | 58.44 | 48 | 21 |
| 2 | 158.7 | 3.20 | 33 | 2.03 | 4.22 | 48 | 39.27 | 81.81 | 48 | 18 |
| 3 | 146.8 | 3.20 | 250 | 9.77 | 20.36 | 48 | 33.66 | 70.13 | 48 | 20 |
| 4 | 131.0 | 3.20 | 325 | 22.77 | 47.44 | 48 | 22.44 | 46.75 | 48 | 22 |
| 5 | 79.4 | 3.20 | 1000 | 47.01 | 97.94 | 48 | 11.22 | 23.38 | 48 | 31 |
| 6 | 119.0 | 3.20 | 5 | 2.52 | 5.25 | 48 | 56.10 | 116.88 | 48 | 26 |
| 7 | 90.0 | 4.13 | 150 | 3.97 | 8.28 | 48 | 74.05 | 154.28 | 48 | 33 |
| 8 | 134.9 | 3.20 | 44 | 11.12 | 18.54 | 60 | 37.03 | 61.71 | 60 | 15 |
| 9 | 138.9 | 3.20 | 17 | 6.67 | 13.90 | 48 | 41.51 | 86.49 | 48 | 22 |
| 10 | 134.3 | 2.10 | 74 | 18.80 | 31.34 | 60 | 5.61 | 9.35 | 60 | 9 |
| 11 | 134.9 | 3.20 | 23 | 17.52 | — | 100 | 28.05 | — | 100 | 0 |
| Comparative Example No. | | | | | | | | | | |
| 1 | 158.7 | 3.20 | 31 | 30.03 | 62.56 | 48 | — | — | — | 15 |

TABLE 2

| | $x_1$ | $x_2$ | z/y | $y/(x_1 + x_2)$ | Mg/Ca | Baking Temp. (° C.) | Ion Exchange Property ($CaCO_3$ mg/g·min) |
|---|---|---|---|---|---|---|---|
| Example Nos. | | | | | | | |
| 1 | 0.25 | 0.75 | 0 | 1.70 | — | 600 | 191 |
| 2 | 0.35 | 0.65 | 0 | 2.00 | — | 700 | 140 |
| 3 | 0.30 | 0.70 | 0 | 1.85 | — | 650 | 195 |
| 4 | 0.20 | 0.80 | 0 | 1.65 | — | 600 | 188 |
| 5 | 0.10 | 0.90 | 0.24 | 1.00 | 0 | 700 | 108 |
| 6 | 0.50 | 0.50 | 0 | 1.50 | — | 550 | 132 |
| 7 | 0.66 | 0.34 | 0.12 | 1.20 | 15 | 750 | 112 |
| 8 | 0.33 | 0.67 | 0.02 | 1.70 | 0.1 | 600 | 188 |
| 9 | 0.37 | 0.63 | 0.01 | 1.75 | 0 | 600 | 189 |
| 10 | 0.05 | 0.95 | 0 | 1.50 | — | 600 | 131 |
| 11 | 0.25 | 0.75 | 0 | 1.70 | — | 600 | 110 |
| Comparative Example No. | | | | | | | |
| 1 | — | 1.00 | — | 2.00 | — | 700 | 60 |

TABLE 3

| | | Cullets | | | | | Weight (g) of NaOH | | | Weight (g) of KOH | | | Water |
| | Weight (g) | $SiO_2/(Na,K)_2O$ (molar ratio) | $K_2O/Na_2O$ (molar ratio) | $CaO/SiO_2$ (molar ratio) | $MgO/CaO$ (molar ratio) | Average Particle Size (μm) | Solid Content | Aqueous Soln. | Conc. (% by weight) | Solid Content | Aqueous Soln. | Conc. (% by weight) | Content (% by wt.) |
|---|---|---|---|---|---|---|---|---|---|---|---|---|---|
| Example Nos. | | | | | | | | | | | | | |
| 12 | 134.9 | 3.20 | 0.1 | 0.03 | 0.1 | 85 | 16.94 | 35.3 | 48 | 20.63 | 42.99 | 48 | 18 |
| 13 | 133.5 | 3.20 | 0.2 | 0.1 | 0.2 | 500 | 14.84 | 30.92 | 48 | 27.91 | 58.14 | 48 | 19 |
| 14 | 123.5 | 3.20 | 0.75 | 0.01 | 0.2 | 150 | 17.64 | 36.76 | 48 | 6.28 | 13.08 | 48 | 14 |
| 15 | 131.5 | 3.20 | 0.5 | 0.08 | 0.5 | 125 | 13.46 | 28.05 | 48 | 18.91 | 39.39 | 48 | 16 |
| 16 | 120.3 | 3.20 | 0 | 0.04 | 5 | 75 | 10.78 | 22.46 | 48 | 28.91 | 60.23 | 48 | 21 |
| 17 | 150.2 | 3.25 | 0 | 0.24 | 0 | 1000 | 20.29 | 33.82 | 60 | 31.33 | 52.21 | 60 | 22 |
| 18 | 133.5 | 3.25 | 0 | 0.05 | 0 | 12 | 21.79 | — | 100 | 29.55 | — | 100 | 0 |
| 19 | 135.3 | 2.95 | 0.03 | 0 | — | 60 | 18.39 | 38.3 | 48 | 3.74 | 7.78 | 48 | 12 |
| 20 | 120.1 | 2.95 | 0.37 | 0 | — | 250 | 14.34 | 29.87 | 48 | 7.41 | 15.44 | 48 | 14 |
| 21 | 158.7 | 3.20 | 0 | 0 | — | 33 | 2.03 | 4.22 | 48 | 39.27 | 81.81 | 48 | 18 |
| Comparative Example No. | | | | | | | | | | | | | |
| 2 | 135.5 | 3.20 | — | 0 | — | 125 | — | — | — | 49.97 | 104.1 | 48 | 21 |

TABLE 3-continued

| | | Cullets | | | | Weight (g) of NaOH | | | Weight (g) of KOH | | | Water |
|---|---|---|---|---|---|---|---|---|---|---|---|---|
| | Weight (g) | SiO$_2$/ (Na,K)$_2$O (molar ratio) | K$_2$O/Na$_2$O (molar ratio) | CaO/SiO$_2$ (molar ratio) | MgO/CaO (molar ratio) | Average Particle Size (μm) | Solid Content | Aqueous Soln. | Conc. (% by weight) | Solid Content | Aqueous Soln. | Conc. (% by weight) | Content (% by wt.) |
| 3 | 135.5 | 3.20 | 0.20 | 0 | — | 250 | 203.13 | 423.18 | 48 | 27.21 | 56.69 | 48 | 37 |
| 4 | 132.3 | 3.20 | 0.00 | 0 | — | 750 | 36.77 | 76.6 | 48 | — | — | — | 18 |
| 5 | 118.7 | 12.00 | 0.05 | 0 | — | 500 | 46.45 | 96.78 | 48 | 19.56 | 40.75 | 48 | 26 |

TABLE 4

| | $x_1$ | $x_2$ | z/y | y/($x_1 + x_2$) | Mg/Ca | Baking Temp. (° C.) | Ion Exchange Property (CaCO$_3$ mg/ g · min) |
|---|---|---|---|---|---|---|---|
| Example Nos. | | | | | | | |
| 12 | 0.25 | 0.75 | 0.030 | 1.80 | 0.1 | 600 | 190 |
| 13 | 0.35 | 0.65 | 0.100 | 1.70 | 10.0 | 600 | 182 |
| 14 | 0.35 | 0.65 | 0.010 | 2.00 | 0.2 | 600 | 175 |
| 15 | 0.40 | 0.60 | 0.080 | 1.85 | 0.5 | 620 | 195 |
| 16 | 0.30 | 0.70 | 0.040 | 1.75 | 5.0 | 600 | 163 |
| 17 | 0.25 | 0.75 | 0.240 | 1.70 | 30.0 | 700 | 142 |
| 18 | 0.25 | 0.75 | 0.050 | 1.60 | 1.5 | 620 | 133 |
| 19 | 0.03 | 0.97 | 0.000 | 2.00 | — | 700 | 198 |
| 20 | 0.27 | 0.73 | 0.020 | 1.90 | 8.0 | 600 | 158 |
| 21 | 0.35 | 0.65 | — | 2.00 | — | 600 | 196 |
| Comparative Example No. | | | | | | | |
| 2 | 1.00 | 0.00 | 0 | 2 | — | 600 | 65 |
| 3 | 0.10 | 0.90 | 0 | 0.5 | — | 600 | 58 |
| 4 | 0.00 | 1.00 | 0 | 1.7 | — | 700 | 71 |
| 5 | 0.20 | 0.80 | 0 | 2 | — | 600 | 77 |

INDUSTRIAL APPLICABILITY

According to a method for producing a crystalline, inorganic ion exchange material of the present invention, the use of inexpensive cullets enables the production of high-performance silicate ion exchange materials in a simple manner.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for producing a crystalline, inorganic ion exchange material having the following composition:

$$x_1 K_2O \cdot x_2 Na_2O \cdot y SiO_2 \cdot z MeO,$$

wherein $x_1$, $x_2$, y and z are numerical values satisfying the following relationships: y/($x_1+x_2$)=1.0 to 2.1, z/y=0.002 to 0.32, $x_1/x_2$=0.01 to 2.0, and Me stands for Ca and/or Mg and Mg/Ca=0 to 100, the method comprising the steps of adding and blending one or more alkali metal compounds and one or more alkaline earth metal compounds in cullets having a composition of SiO$_2$/Na$_2$O=1.5 to 4.2, and baking the resulting mixture.

2. The method according to claim 1 or 2, wherein said cullets are obtainable by the steps of fusing a mixture of silica sand and sodium carbonate at a temperature of from 1000 to 1400° C., and cooling a resulting mixture.

3. The method according to claim 1, wherein said cullets have a composition of SiO$_2$/(Na,K)$_2$O=2.1 to 4.2, X/Na=0 to 2.0, and Ca/Si=0 to 0.32.

4. The method according to claim 3, wherein K/Na of the cullets is 0.01 to 2.0.

5. The method according to claim 1, wherein the alkali metal compound is selected from the group consisting of potassium hydroxide, sodium hydroxide, potassium carbonate, sodium carbonate, and sodium sulfate, and wherein the alkaline earth metal compound is selected from the group consisting of calcium oxide, magnesium oxide, calcium hydroxide, magnesium hydroxide, calcium carbonate, magnesium carbonate, calcium nitrate, magnesium nitrate, calcium chloride, and magnesium chloride.

6. The method according to claim 1, wherein the cullets have an average particle size of from 2 to 9000 μm, and wherein a 12–60% by weight KOH aqueous solution and a 12–60% by weight NaOH aqueous solution are added as alkali metal compounds, thereby giving a water content of from 1 to 45% by weight after addition.

7. The method according to claim 2, wherein said cullets have a composition of SiO$_2$/(Na,K)$_2$O=2.1 to 4.2, K/Na=0 to 2.0, and Ca/Si=0 to 0.32.

8. The method according to claim 2, wherein the alkali metal compound is selected from the group consisting of potassium hydroxide, sodium hydroxide, potassium carbonate, sodium carbonate, and sodium sulfate, and wherein the alkaline earth metal compound is selected from the group consisting of calcium oxide, magnesium oxide, calcium hydroxide, magnesium hydroxide, calcium carbonate, magnesium carbonate, calcium nitrate, magnesium nitrate, calcium chloride, and magnesium chloride.

9. The method according to claim 3, wherein the alkali metal compound is selected from the group consisting of potassium hydroxide, sodium hydroxide, potassium carbonate, sodium carbonate, and sodium sulfate, and wherein the alkaline earth metal compound is selected from the group consisting of calcium oxide, magnesium oxide, calcium hydroxide, magnesium hydroxide, calcium carbonate, magnesium carbonate, calcium nitrate, magnesium nitrate, calcium chloride, and magnesium chloride.

10. The method according to claim 4, wherein the alkali metal compound is selected from the group consisting of potassium hydroxide, sodium hydroxide, potassium carbonate, sodium carbonate, and sodium sulfate, and wherein the alkaline earth metal compound is selected from the group consisting of calcium oxide, magnesium oxide, calcium hydroxide, magnesium hydroxide, calcium carbonate, magnesium carbonate, calcium nitrate, magnesium nitrate, calcium chloride, and magnesium chloride.

* * * * *